United States Patent [19]

Catanzarite

[11] 4,407,910

[45] Oct. 4, 1983

[54] ANODE NEUTRALIZATION

[76] Inventor: Vincent O. Catanzarite, 7044 Mira Vista, Las Vegas, Nev. 89120

[21] Appl. No.: 306,132

[22] Filed: Sep. 28, 1981

Related U.S. Application Data

[63] Continuation-in-part of Ser. No. 32,298, Apr. 23, 1979, abandoned, which is a continuation of Ser. No. 893,201, Apr. 3, 1978, abandoned.

[51] Int. Cl.³ .......................................... H01M 10/34
[52] U.S. Cl. .................................. 429/57; 429/104; 429/105; 429/196; 429/62
[58] Field of Search ............... 429/102, 104, 196, 247, 429/57, 62, 105

[56] References Cited

U.S. PATENT DOCUMENTS

| | | | |
|---|---|---|---|
| 3,379,570 | 4/1968 | Berger et al. | 429/247 X |
| 3,907,593 | 9/1975 | Marincic | 429/196 |
| 3,926,669 | 12/1975 | Auborn | 429/196 |
| 3,966,492 | 6/1976 | Ludwig | 429/102 |
| 4,012,564 | 3/1977 | Auborn | 429/196 X |

Primary Examiner—Charles F. LeFevour
Attorney, Agent, or Firm—Flehr, Hohbach, Test, Albritton & Herbert

[57] ABSTRACT

An electrochemical cell having an alkali or alkaline metal anode, a cathode or current collector, an electrolyte and an anode neutralizing agent consisting of an inorganic solid positioned contiguous to and in intimate contact with the anode. Said neutralizing agent is non-reactive with all cell components below a predetermined temperature near the melting point of the anode. At or near the melting point of the anode, the agent and anode enter into endothermic or at most mildly exothermic reaction.

6 Claims, 2 Drawing Figures

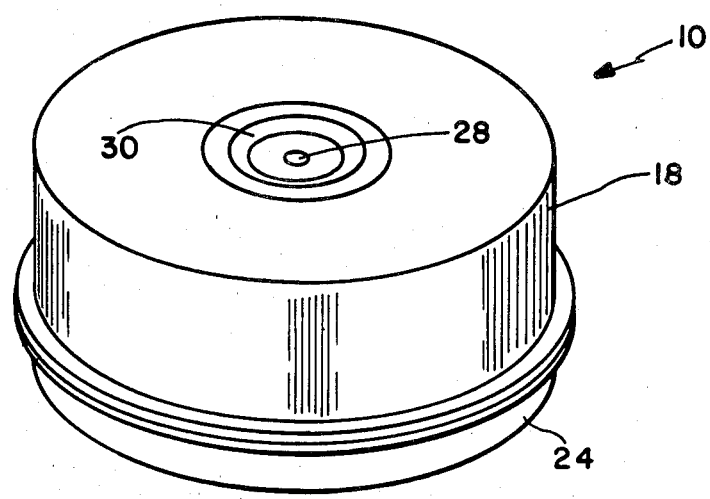
FIG. — 1
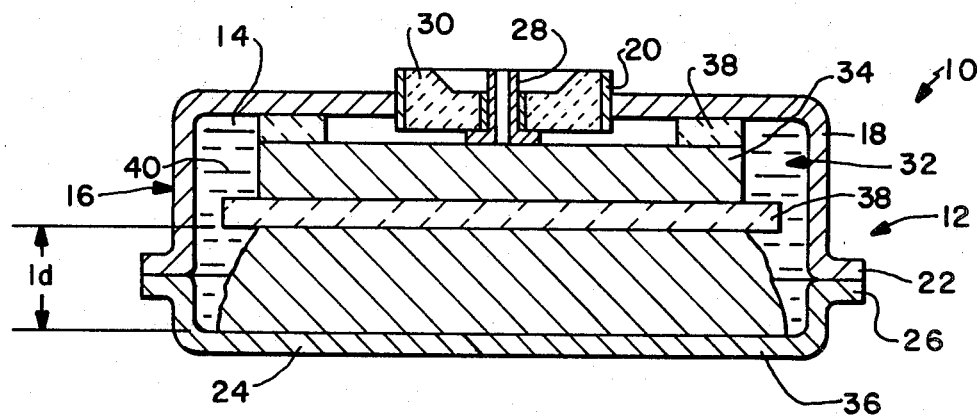
FIG. — 2

ANODE NEUTRALIZATION

This application is a continuation-in-part of copending commonly assigned Ser. No. 32,298, filed Apr. 23, 1979, which in turn is a continuation of Ser. No. 893,201, filed Apr. 3, 1978, both now abandoned.

This invention relates to high energy electrochemical power cells. More particularly, it relates to cells having an oxidizable anode material that is chemically very active and under certain circumstances explosive in the presence of other cell components unless precisely controlled.

Recently there has been a rapid growth in portable electronic products requiring electrochemical cells to supply the energy. Examples are calculators, cameras and digital watches. These products, however, have highlighted the deficiencies of the existing power cells for demanding applications. For example, digital watches were developed using the silver oxide cell, and although these watches have become popular, it is now generally recognized that the least developed component of the digital watch system is the power cell. In particular, the energy density of the silver cells is such that thin, stylish watches, calculators, miniature computer games, etc., with reasonable operating life are difficult to make. Additionally, these cells have poor storage characteristics, low cell voltages, and leakage problems.

In an effort to develop a cell that addresses one or more of the foregoing problems, substantial work has been done with cell chemistries using an alkali metal anode, particularly lithium. The composition of the cathode and electrolyte materials consisting of a solvent and solute do vary. The electrical characteristics of these cells such as energy per unit volume, called volumetric energy density, cell voltage, and internal impedance, vary greatly.

Although cells known in the art offer many advantages, there are still several problems to be solved before they can be made widely available. Foemost among these problems is safety. Many of the cells known in the art, particularly the higher power cells using lithium anodes, are explosive if the cell reaches a temperature at which the anode becomes liquid. This problem is particularly pronounced in cells having lithium anode and a liquid cathode consisting of solute dissolved in an oxyhalide or thiohalide solvent.

It is therefore an object of this invention to minimize the risk of explosion in an electrochemical cell, having an alkali metal anode, by preventing the violent reaction of molten anode material with other cell components.

Another object of the invention is to minimize the risk of explosion in an electrochemical cell having a lithium anode and an electrolyte consisting of a solute dissolved in either an oxyhalide and/or a thiohalide, by preventing the violent reaction of the lithium with any other cell component or discharge product.

Yet another object of the invention is to minimize the risk of explosion in an electrochemical cell having a lithium anode and a liquid cathode consisting of a solute dissolved in thionyl chloride, by preventing the violent reaction of molten lithium with any other cell component or discharge product.

Finally, it is an object of this invention to rapidly neutralize the anode material above a predetermined temperature by means of controlled chemical reactions.

These and other objects of the invention are achieved by the inclusion, in an electrochemical cell having an alkali metal anode, a cathode or current collector spaced therefrom and an electrolyte in contact with the cathode and anode, of an anode neutralizing agent consisting of an inorganic solid, contiguous to and in intimate contact with the anode, such agent being substantially nonreactive with all cell components or reaction products below the melting temperature of said anode, but reactive with the anode at about the melting point thereof, with the reaction between the agent and anode being either endothermic, neutral or only mildly exothermic. In a preferred embodiment the agent may take the form of a ceramic material. In the case of a lithium anode, about a 95% alumina, 5% silica ceramic, in the form of a fibrous paper which also may serve as a separator between anode and cathode, is preferred.

Besides alumina containing small amounts of silica, other ceramic materials are useful as neutralizing agents in the instant invention. For example, the other oxides of Group 3B such as boron trioxide ($B_2O_3$), gallium trioxide ($Ga_2O_3$), indium trioxide ($In_2O_3$), and thallium trioxide ($Tl_2O_3$) are also useful. In addition, the various minerals, in dehydrated form, containing Group 3B compounds such as borax ($Na_2B_4O_7 \cdot 10H_2O$), bauxite ($Al_2O(OH)_4$), micas ($3Al_2O_3 \cdot K_2O \cdot 6SiO_2 \cdot 2H_2O$), feldspar ($K_2O \cdot Al_2O_3 \cdot 6SiO_2$), cryolite ($Na_3AlF_6$), spinel ($MgAl_2O_4$) and crysoberyl ($BeAl_2O$) my also be useful neutralizers according to the instant invention.

The oxides of group 2A as well as the minerals thereof are also useful neutralizing agents. For example beryllium oxide, magnesium oxide, calcium oxide, strontium oxide and barium oxide may be useful in addition to the minerals beryl ($3BeO \cdot Al_2O_3 \cdot 6SiO_2$), dolomite ($CaCO_3 \cdot MgCO_3$), carnallite ($MgCl_2 \cdot KCl \cdot 6H_2O$), and barytes such as barium sulfate, etc.

The oxides of Group 5B as well as minerals thereof are useful neutralizing agents, i.e., phosphorus pentoxide ($P_2O_5$), arsenic oxides ($As_4O_6$, $As_2O_5$), antimony oxides ($Sb_4O_6$, $Sb_2O_5$) and bismuth trioxide ($Bi_2O_3$), fluorapatite ($3Ca_3(PO_4)_2 \cdot Ca(F, Cl)_2$), as well as the various sulfide minerals of various metals such as copper, lead and silver which are known to contain arsenic, antimony and bismuth.

The oxides of Group 4A particularly zirconium oxide ($ZrO_2$), have been found to be useful as neutralizing agents in the instant invention. In addition o titanium oxide, ($TiO_2$), and hafnium oxide, ($HfO_2$), various minerals such as ilmenite ($FeTiO_3$), rutile, baddeleyite ($ZrO_2$) and zircon ($ZrSiO_4$) have been found to be useful.

While minerals comprising a substantial amount of silicon oxide have been found to yield sharp exotherms in the presence of lithium metal at its melting point (180° C.), small amounts thereof up to about 10% by weight of neutralizing agent material are not detrimental to the operation of the invention. Therefore, small amounts of silicon oxide, germanium oxide ($GeO_2$), and tin and lead oxides, as well as silica or silicate minerals such as zeolites, may be included in the neutralizers according to the instant invention.

If minerals containing mixtures of metal oxides are used such as feldspar which contains both alumina and silicon oxide, the neutralizing agent will react acccording to the nature of the major metal oxide component.

FIG. 1 is a perspective view of an electrochemical cell useful for illustrating the present invention.

FIG. 2 is a cross sectional view of the cell of FIG. 1.

Among all of the known combinations of lithium anodes with different cathodes and electrolytes, those believed to have among the highest energy density and lowest internal impedance use certain inorganic liquids as the active cathode depolarizer. This type of cell chemistry is commonly referred to as "liquid cathode," and it is with respect to this general chemistry that the preferred embodiment will be described. First, however, it is desirable to describe the liquid cathode cells.

Early liquid cathode cells used liquid sulfur dioxide as the active cathode depolarizer as described in U.S. Pat. No. 3,567,515, issued to Maricle, et al. on Mar. 2, 1971. Since sulfur dioxide is not a liquid at room temperature and at atmospheric pressure it proved to be quite a difficult chemistry with which to work. More importantly, sulfur dioxide cells are unsafe for most consumer applications due to their propensity to explode under certain circumstances.

A major step forward in the development of liquid cathode cells was the discovery that a class of inorganic materials, generally called oxyhalides, which are liquids at room temperature, also perform the function of being an active cathode depolarizer. Additionally, these materials may also be used as the electrolyte solvent. Liquid cathode cells using oxyhalides are described in U.S. Pat. No. 3,926,669, issued to Auborn on Dec. 16, 1975, and in British Pat. No. 1,409,307, issued to Blomgren, et al., on Oct. 18, 1975. At least one of the oxyhalides, thionyl chloride ($SOCl_2$), in addition to having the general characteristics described above, also provides substantial additional energy density.

As described in the Auborn and Blomgren patents, the anode is lithium metal or alloys of lithium and the electrolyte solution is an ionically conductive solute dissolved in a solvent that is also an active cathode depolarizer.

The solute may be a simple or double salt which will produce an ionically conductive solution when dissolved in the solvent. Preferred solutes are complexes of inorganic or organic Lewis acids and inorganic ionizable salts. The requirements for utility are that the salt, whether simple or complex, be compatible with the solvent being employed and that it yield a solution which is ionically conductive. According to the Lewis or electronic concept of acids and bases, many substances which contain no active hydrogen can act as acids or electron acceptors, or electron doublets. In U.S. Pat. No. 3,542,602 it is suggested that the complex or double salt formed between a Lewis acid and an ionizable salt yields an entity which is more stable than either of the components alone.

Typical Lewis acids suitable for use in the present invention include aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

The double salts formed by a Lewis acid and an inorganic ionizable salt may be used as such or the individual components may be added to the solvent separately to form the salt. One such double salt, for example, is that formed by the combination of aluminum chloride and lithium chloride to yield lithium aluminum tetrachloride.

In addition to an anode, an active cathode depolarizer and an ionically conductive electrolyte, these cells require what is known in the art as a current collector.

According to Blomgren, any compatible solid, which is substantially electrically conductive and inert in the cell, will be useful as a cathode collector since the function of the collector is to permit external electrical contact to be made with the active cathode material. It is desirable to have as much surface contact as possible between the liquid cathode and the current collector. Therefore, a porous material is preferred since it will provide a high surface area interface with the liquid cathode material. The current collector may be metallic and may be present in any physical form such as metallic film, screen or a pressed powder. Examples of some suitable metal current collectors are provided in Table II of the Auborn patent. The current collector may also be made partly or essentially completely of carbon. Examples provided in the Blomgren patent use graphite.

Electrical separation of current collector and anode is required to insure that cathode or anode reactions do not occur unless electrical current flows through an external circuit. Since the current collector is insoluble in the electrolyte and the anode does not react spontaneously with the electrolyte, a mechanical separator may be used.

In many of the cells to which the present invention is directed, the anode is chemically stable with all of the original cell components—at least at normal operating temperatures. But dangerous explosions have been reported when the temperature exceeded the melting point of lithium (180° C.). It is generally believed that the explosions are caused by a rapid, exothermic reaction between molten lithium and other cell components, principally thionyl chloride. This reaction does not occur at ordinary temperatures because the solid lithium is physically isolated from the thionyl chloride by a thin, adherent film of lithium chloride. Above the melting point of lithium, however, this solid film can no longer isolate liquid lithium from liquid thionyl chloride, and a very exothermic reaction is initiated. The reaction proceeds very rapidly, quickly involving all reactive cell components, resulting in an explosion. The phenomenon has come to be known as "thermal runaway", and there are many articles in the literature relating to this problem. The explosion of cells of the prior art has been one of the principal reasons that this system has not been widely used.

It has been discovered that it is possible to select certain materials that will neutralize the anode at a certain predetermined temperature. By neutralization of the anode is meant to react the anode with the neutralizing agent such that the resultant material forms one or more new solid phases with said neutralizing agent; which new solid phases are chemically nonreactive with the remaining cell chemicals, discharge product or electrolysis products. Additionally, the reaction between the anode and neutralizing agent is preferably endothermic or mildly exothermic. By mildly exothermic is meant that the energy released by reaction cannot of itself be sufficient to create any appreciable risk of explosion. It is preferred that the reaction between the anode and neutralizing agent occur near the melting point of the anode; and since different anodes melt at different temperatures, it is important to select the neutralizing agent to accommodate different anode materials. Thus, the mild, controlled reaction between the anode and the neutralizing agent precludes the violent reaction between the anode (at or near its melting point) and other cell chemicals, components, or products. Finally, below the critical predetermined temperature, the neutralizing agent should not interfere with the normal operation of the cell, either chemically, electrically or mechanically.

It has found that certain inorganic materials, in both glass and ceramic form (these terms will be used interchangeably hereinafter) meet the foregoing requirement. These materials are usually made from metal oxides with each such metal oxide being a phase of the total glass or ceramic. The principal distinction between a glass and a ceramic is that a ceramic has a crystalline structure whereas a glass does not. The chemical and physical properties of these materials useful in the present invention may be summarized graphically in a phase diagram which shows the melting point of the material as a function of the percentage and type of metal oxide in each phase. A unique characteristic of many ceramics is that they are capable of chemically reacting with certain other materials (including metals, salts and even other ceramics) even below the melting point of the ceramic. Moreover, this reaction can incorporate the other material to produce another, new, ceramic phase. For example, this type of reaction is well-known in the art of metallized ceramics where a metal and a ceramic may be strongly bonded by a reaction which occurs below the melting point of the ceramic. The bond comprises a new ceramic phase or phases which incorporate the metal into its structure. With most ceramics, there is a minimum temperature above which certain other materials will react with the ceramic to form a new ceramic. Below this temperature, virtually no reaction takes place. Above this temperature, a reaction does occur to form the new ceramic and the percentage that the material makes up of the new ceramic is dependent upon how high the temperature is above the minimum temperature. Given a known anode material such as a specific alkali metal, it is possible to select a ceramic with which it will react at a predetermined temperature either above or below the melting point of the alkali metal, according to the desired result. Thus it is possible to choose a glass or ceramic that forms a phase with an anode at exactly the right temperature to preclude the anode from liquefying but not to preclude normal operation. Also, the inclusion of an additional phase in a glass or ceramic is usually an endothermic reaction.

In order for the invention to work most effectively, the neutralizing agent must be contiguous to and in intimate contact with the anode and spaced between the anode and cathode. However, it must be porous so as to not interfere with the flow of ions electrolyte. It has also been found that these neutralizing materials may be fabricated to act as separators. Accordingly, a preferred embodiment of the invention is the utilization of the same member as both the separator and neutralization agent.

In the preferred embodiment of the invention as used in an electrical cell containing a lithium anode, the preferred neutralizing agent and separator material is a ceramic comprising about 95% alumina and about 5% silica in the form of a fibrous paper.

Besides alumina containing small amounts of silica, other ceramic materials are useful as neutralizing agents in the instant invention. For example, the other oxides of Group 3B such as boron trioxide ($B_2O_3$), gallium trioxide ($Ga_2O_3$), indium trioxide ($In_2O_3$), and thallium trioxide ($Tl_2O_3$) are also useful. In addition, the various minerals, in dehydrated form, containing Group 3B compounds such as borax ($Na_2B_4O_7 \cdot 10H_2O$), bauxite ($Al_2O(OH)_4$), micas ($3Al_2O_3 \cdot K_2O \cdot 6SiO_2$), feldspar ($K_2O \cdot Al_2O_3 \cdot 6SiO_2$), cryolite ($Na_3AlF_6$), spinel ($MgAl_2O_4$) and crysoberyl ($BeAl_2O$) are also useful neutralizers according to the instant invention. The oxides of Group 2A as well as the minerals thereof are also useful, such as beryllium oxide, magnesium oxide, calcium oxide, strontium oxide and barium oxide are useful in addition to the minerals beryl ($Be_3Al_2(SiO_3)_6$), dolomite ($CaCo_3 \cdot MgCo_3$), carnallite ($MgCl_2 \cdot 6H_2O$), and barytes such as barium sulfate, etc. are also useful. The oxides of Group 5B as well as minerals thereof are also useful, i.e., phosphorus pentoxide ($P_2O_5$), arsenic oxides ($As_4O_6$, $As_2O_5$), antimony oxides ($Sb_4O_6$, $Sb_2O_5$) and bismuth trioxide ($Bi_2O_3$), fluorapatite ($3Ca_3(PO_4)_2 \cdot Ca(F, Cl)_2$), as well as the various sulfide minerals of various metals such as copper, lead and silver which are known to contain arsenic, antimony and bismuth. The oxides of Group 4A, particularly zirconium oxide ($ZrO_2$), and the oxides titanium oxide, ($TiO_2$), and hafnium oxide, ($HfO_2$), as well as minerals such as ilmenite ($FeTiO_3$), rutile, baddeleyite ($ZrO_2$) and zircon ($ZrSiO_4$) have been found to be useful.

Particularly preferred neutralizing agents are alumina, zirconium oxide, magnesium oxide, calcium oxide, phosphorous pentoxide ($P_2O_5$) and boron trioxide. The neutralization reaction of the above materils with an alkali metal anode, such as lithium, is not detrimentally affected by the presence of the other cell materials. Therefore, the ceramic neutralizing agent will neutralize molten lithium even in the presence of a cell electrolyte such as aluminum trichloride, liquid cathode depolarizers such as thionyl chloride or sulfuryl chloride and/or organic solvents such as organic cell sulvents such as propylene carbonate.

Turning now to the drawings, wherein like components are designated by like reference numerals in the various figures, an electrochemical cell constructed in accordance with the present invention is illustrated and generally designated by the reference numeral 10. While the particular cell illustrated is a button battery, it will become apparent hereinafter that all cells including the larger sized cells may incorporate the various features of the present invention to be described with respect to cell 10.

Referring now to FIGS. 1 and 2, cell 10 is shown to include an overall casing arrangement 12 which defines an internal, fluid tight chamber 14. This overall casing arrangement includes a casing 16 which is comprised of a top cover 18 having a central opening 20 extending through its top end and an outwardly flared circumferential flange 22 located at and around its bottom end. The casing also includes a bottom cover 24 having an outwardly flared circumferential flange 26 which is welded or otherwise suitable fastened to the top cover around the underside of flange 22, as best illustrated in FIG. 2. The casing may be of any desired shape and constructed of any suitable material, so long as the selection is compatible with the present invention. However, the casing is preferably identical in design to the casing described in commonly assigned co-pending U.S. patent application Ser. No. 840,522, filed on Oct. 11, 1977, which is incorporated by reference herein.

In addition to casing 16, the overall casing arrangement 12 includes a pair of electrically insulated terminals, one of which is the casing itself. The other electrode 28, is constructed of any suitable electrically conductive material, such as stainless steel. Electrode 28 may be utilized to introduce the cell liquid constituent into compartment 14 and, hence, may be tubular. This terminal extends through opening 20 and is spaced from top cover 18 such that one section of the terminal is positioned within chamber 14 and an opposite end section is positioned outside the casing.

In order to isolate terminal 28 from the casing, overall casing arrangement 12 also includes a circumferential insulation member 30 which is located within and which fills opening 20 in top cover 18, concentrically around terminal 28, thereby insulating this terminal from the casing. The outer circumferential surface of the insulator is bonded in a continuous fashion to the top cover 18 around opening 20 and its inner circumferential surface is bonded in continuous fashion to and around the outer surface of terminal 28. In a preferred embodiment, insulator 30 is a ceramic insulator described more fully in commonly assigned U.S. Pat. No. 4,127,702, which is incorporated herein by referenc.

In addition to overall casing arrangement 12, battery 10 includes an arrangement of chemically interacting components which are generally designated at 32 in FIG. 2 and which produce the desired voltage difference across the cell terminals.

These components include an anode 34 and a solid cathode 36 spaced from and in a plane parallel to anode 34. Separator 38 comprising neutralizer material mechanically separates the anode from solid cathode and is in intimate contact with said anode.

Anode 34 is an alkali metal such as lithium, sodium, potassium, calcium; but in a preferred embodiment it is lithium.

Separator 38 is also the anode neutralizing agent and is a fibrous sheet material made from a two-phase ceramic consisting of 95% (by dry wt) $Al_2O_3$ and 5% $SiO_2$. This two-phase ceramic system in the presence of lithium, converts to a three-phase lithium rich ceramic system below or at the melting point of lithium.

Cathode collector 36 consists of a high surface area carbon such as acetylene black. In addition to these components, the overall voltage difference producing arrangement includes an electrolyte solution, preferably of the type previously described including a solute (salt) and a solvent which also acts as the active cathode depolarizer (liquid cathode) generally designated at 40. This solution is located within and fills chamber 14 and thus is in direct contact with the anode, cathode collector and inner surface of casing 16.

It is understood that the foregoing specific embodiment is included for purposes of illustration, and is not intended to limit the scope of the invention which is defined in the following claims.

What is claimed is:

1. A method of preventing violent reaction in an electrochemical cell comprising an alkali metal anode material, cathode material and electrolyte consisting of a solute dissolved in an oxyhalide or thiohalide solvent comprising the step of placing a ceramic material contiguous to said anode material within said cell, said ceramic material being substantially inactive below a predetermined temperature whereby said ceramic material is capable of reacting at said predetermined temperature to form a product with said anode material, said product being substantially inactive and said reaction being at most mildly exothermic, wherein said ceramic material consists essentially of 95% $Al_2O_3$ and 5% $SiO_2$ by weight.

2. A method according to claim 1 wherein said neutralizing agent is in intimate contact with said anode.

3. A method according to claim 1 wherein said cell contains a liquid oxyhalide.

4. A method according to claim 3 wherein said anode comprises an alloy of Li and at least one element of the group consisting of Na, K, Rb, Cs, Fr, Be, Ca, Mg, Ba, Sr, Ra, B, Al, Ga, In, Si, Ge, Sn and Pb.

5. A method according to claim 3 wherein said anode comprises lithium.

6. A method according to claim 3 wherein said oxyhalide is thionyl chloride.

* * * * *